United States Patent
Phillips et al.

(10) Patent No.: US 10,664,848 B2
(45) Date of Patent: May 26, 2020

(54) METHODS, MEDIUMS, AND SYSTEMS FOR DOCUMENT AUTHORIZATION

(71) Applicant: Capital One Services, LLC, McLean, VA (US)

(72) Inventors: Jeremy Phillips, Brooklyn, NY (US); Kurry Tran, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/157,071

(22) Filed: Oct. 10, 2018

(65) Prior Publication Data

US 2020/0118140 A1    Apr. 16, 2020

(51) Int. Cl.

| | | |
|---|---|---|
| *G06Q 20/42* | (2012.01) | |
| *G06Q 20/40* | (2012.01) | |
| *G06Q 20/04* | (2012.01) | |
| *G06Q 20/32* | (2012.01) | |

(52) U.S. Cl.
CPC ........... *G06Q 20/42* (2013.01); *G06Q 20/045* (2013.01); *G06Q 20/403* (2013.01); *G06Q 20/3276* (2013.01); *G06Q 20/3278* (2013.01)

(58) Field of Classification Search
CPC .................................................... G06Q 20/40
See application file for complete search history.

(56) References Cited

U.S. PATENT DOCUMENTS

| | | | |
|---|---|---|---|
| 7,742,996 B1 | 6/2010 | Kwan | |
| 7,933,835 B2 | 4/2011 | Keane et al. | |
| 9,934,530 B1 * | 4/2018 | Iacono | G06Q 30/0637 |
| 2002/0040346 A1 | 4/2002 | Kwan | |
| 2012/0084206 A1 | 4/2012 | Mehew et al. | |
| 2014/0129457 A1 * | 5/2014 | Peeler | G06Q 10/067 705/317 |

(Continued)

FOREIGN PATENT DOCUMENTS

| | | | |
|---|---|---|---|
| WO | 2006059129 A1 | 6/2006 | |
| WO | WO-2018063809 A1 * | 4/2018 | ........... G06Q 20/353 |

OTHER PUBLICATIONS

De Luna et al. Mobile payment is not all the same: The adoption of mobile payment systems depending on the technology applied. Technological Forecasting & Social Change. 146 (2019) 931-944 (Received Oct. 18, 2017). (Year: 2017).*

(Continued)

*Primary Examiner* — Virpi H Kanervo

(57) ABSTRACT

Exemplary embodiments relate to secure documents that are capable of being in an activated or deactivated state. When in the activated state, the document may be redeemable; when in the deactivated state, the document may not be redeemable. The document may be issued in the deactivated state and may require activation before being used. In order to activate the document, a user may log into an account associated with the document and scan a code printed on or embedded in the document. Using their account, the user may issue an activation command. This activation process ensures that, at the time the document is transferred, it is either in the presence of the user or the user is aware of the location of the document, and that the user wishes to authorize the transfer. Thus, even if the document is stolen or misplaced, it cannot be used without the requisite authorization.

20 Claims, 8 Drawing Sheets

(56) References Cited

U.S. PATENT DOCUMENTS

| | | | |
|---|---|---|---|
| 2015/0006382 A1* | 1/2015 | Scipioni | G06Q 20/042 |
| | | | 705/44 |
| 2015/0261772 A1* | 9/2015 | Lorenz | G06F 16/215 |
| | | | 707/723 |
| 2017/0093850 A1* | 3/2017 | Kukreja | G06F 21/33 |

OTHER PUBLICATIONS

Ladika, Susan "Credit card on/off switches: More card issuers adding them", CreditCards.com, Aug. 8, 2018, https://www.creditcards.com/credit-card-news/credit-card-on-off-switches.php.

Author Unknown, "Money Orders", Canada Post Corporation, Jan. 15, 2018, https://www.canadapost.ca/tools/pg/manual/PGmoneyorde.asp.

Almazan, Mireya "The use of Barcodes in Mobile Payments: Scanning the Possibilities" GSMA, Jan. 16, 2014, https://www.gsma.com/mobilefordevelopment/programme/mobile-money/the-use-of-barcodes-in-mobile-payments-scanning-the-possibilities/.

* cited by examiner

METHODS, MEDIUMS, AND SYSTEMS FOR DOCUMENT AUTHORIZATION

BACKGROUND

Certain types of documents may be used to transfer resources from one party to another (e.g., a cashier's check, money order, and the like). These documents typically include a number of security features in order to prevent counterfeiting and/or unauthorized use. Unfortunately, many security features rely on the vigilance of a human user to enforce them, and hence can be inadequate if the user is not willing or able to scrutinize the document.

DETAILED DESCRIPTION

Figure 1:
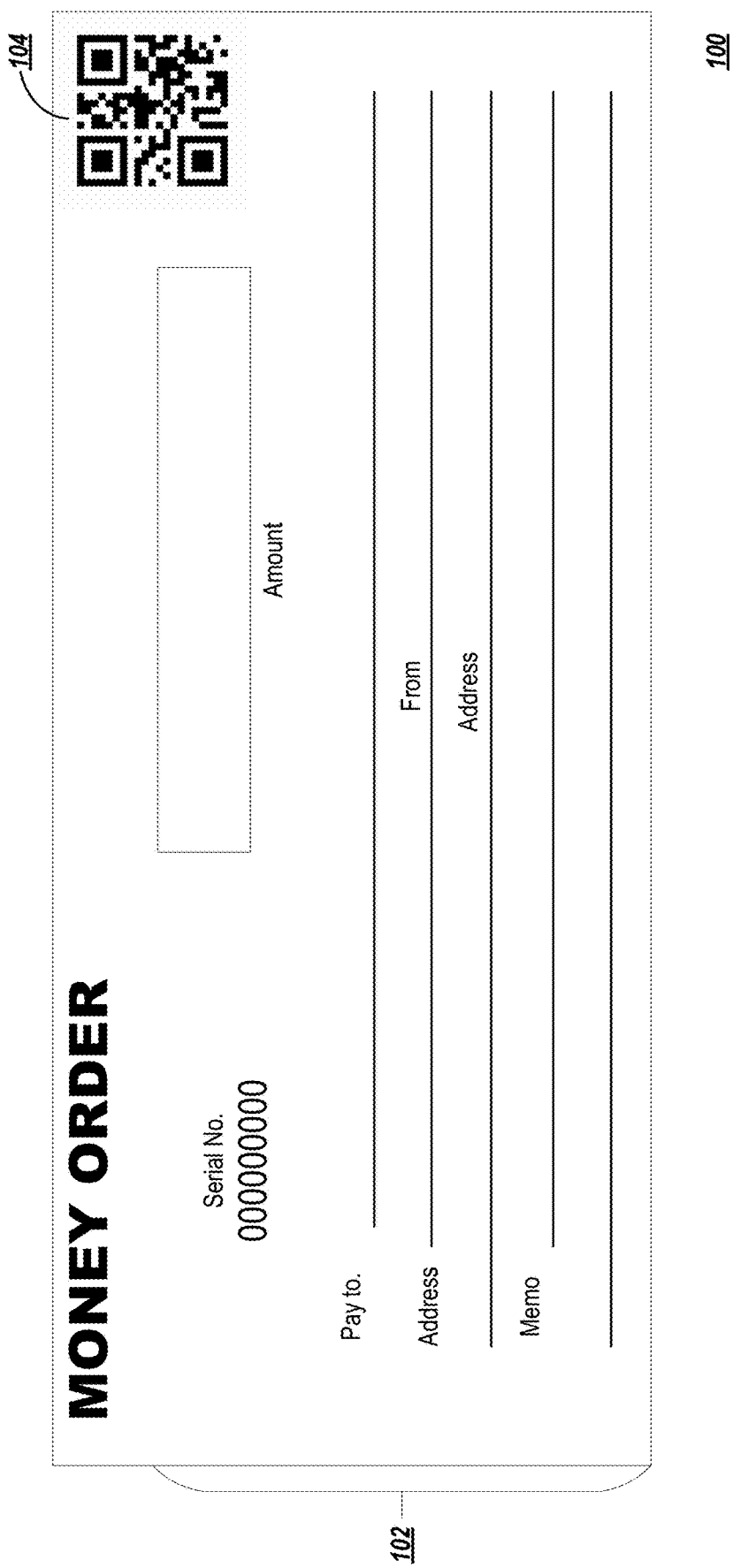
FIG. 1 depicts a document in accordance with exemplary embodiments described herein.

One example of a document security feature is a requirement that an authorizing user sign the document in order to authorize a transfer of resources. However, signatures can be faked, and in many cases a human agent responsible for verifying the signature will not be willing or able to fully validate all signatures. Some documents may be made out to a specific recipient but, once again, a human agent responsible for verifying that the document is used by the appropriate recipient may not be willing or able to do so.

Some such documents can be canceled or refunded, but this process is often cumbersome. For example, a user might need to fill out a form or sign an affidavit verifying that the document has been lost or stolen, and the user might need to wait a certain amount of time before the funds or resources represented by the note are returned to their account (in order to ensure that the document is not redeemed before it expires, which could result in the undesirable situation of the user being refunded and the document being honored).

Exemplary embodiments described herein relate to secure documents, instruments, notes, and the like, which are capable of being in an activated or deactivated state. When in the activated state, the document/instrument/note may be redeemable or convertible for a certain value or may authorize a specified transfer of resources. When in the deactivated state, the document/instrument/note may not be redeemable or convertible, or may not authorize the transfer.

A secure document/instrument/note may be issued in the deactivated state and may require activation before being used.

In order to activate the document/instrument/note, a user may log into their account via a website, application, etc., where the account is associated with the document/instrument/note. The user may scan a code, such as a barcode, quick response (QR) code, a radio frequency identifier (RFID) code, etc. printed on or embedded in the document/instrument/note. Using the website, application, etc., the user may issue a command to activate the document/instrument/note, preferably shortly before, concurrently with, or shortly after transferring the document/instrument/note to a receiving party. This activation process ensures that, at the time the document/instrument/note is transferred, it is physically in the presence of the user and that the user wishes to authorize the transfer. Thus, even if the document/instrument/note is stolen or misplaced, it cannot be used without the requisite authorization.

In other embodiments, the document/instrument/note may be delivered to an intended recipient, and thus may not be in the presence of the originating user. In these embodiments, the originating user may be provided with a code by the issuing institution, allowing the user to remotely activate the document/instrument/note. For further security, the document/instrument/note may be embedded with a device, such as an RFID chip, near field communications (NFC) chip, global positioning system (GPS) receiver/transmitter, etc. that allows the location of the document/instrument/note to be determined (either directly via the device, or indirectly by having the device communicate with another nearby location-enabled device, such as a mobile phone of the receiving user). Thus, the originating user can be reasonably assured that the document/instrument/note is in the possession of the intended recipient, or at a location associated with the intended recipient, before activating the document/instrument/note.

Assuming that the document/instrument/note is in the deactivated state, the note may be cancellable at any time, and the resources or funds represented by the document/instrument/note may be returned to the originating user immediately, or in a relatively short timeframe (as compared to conventional cancelation procedures). In this case, the document/instrument/note may be permanently disabled so that it cannot be redeemed, converted, or used to authorize a resource transfer. Accordingly, the issuing institution can be assured that the document/instrument/note will not be used after the refund is processed.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 depicts an example of a document 100 suitable for use with exemplary embodiments. The document 100 may be a limited-use note redeemable for assets in a specified amount. A limited-use note includes notes that can be redeemed for the assets once, but is itself transferable between different parties a predetermined specified number of times. The predetermined specified number may be one, in which case the limited-use note may be transferred only once, from an originating user to an intended recipient (the recipient may or may not be specified; if so specified, information identifying the intended recipient may or may not be displayed on the note itself). If the predetermined specified number of times is more than one, then the limited-use note may be signed over or endorsed to further parties for the specified number of times. For example, if the predetermined specified number is three, then the limited-use note may be transferred up to three times before it must be redeemed for the specified amount of assets.

The document 100 may be an instrument having a specified value, where the instrument is convertible to the specified value. For example, the instrument may be a money order or cashier's check that can be converted, by the receiving user, into a specified amount of funds. In some embodiments, the instrument may be cash.

The document 100 may, in some embodiments, authorize a transfer of resources (such as funds or other assets) from an originating party to a receiving party.

The document 100 may include security features to prevent theft, counterfeiting, etc. The document 100 may also include identifying information 102, specifying (e.g.) the funds, assets, etc. for which the document 100 is redeemable, the party surrendering the assets/funds, the intended recipient of the assets/funds, addresses of the parties, further memoranda, etc.

The document 100 may also include a physical manifestation of a code 104. In the depicted example, the physical manifestation is a printed quick response (QR) code, although other manifestations may also be used, including (but not limited to) a printed barcode, an identifier number or name, a radio frequency identifier (RFID) tag, a near field communications (NFC) device, or a Bluetooth device. The code may be a numeric code, alphanumeric code, a bit pattern, an image code, an audible code, etc. The code may be distinct from a serial number of the document 100.

The document 100 may be issued in a deactivated state, meaning that the document cannot be used (e.g., redeemed for the specified value). In order to activate the document 100, the user may use a website, application, etc. to log into an account associated with the user and the document 100. In some embodiments, the document 100 may be issued by an institution (such as a bank, post office, etc.), and the account may be the user's account at the institution.

In other embodiments, the account may be a third-party account, such as an account with a party responsible for authenticating the user, validating the document 100, and/or activating the document 100. In this case, the third-party may provide or may interact with an application programming interface (API) allowing the third party to communicate with the issuing institution for purposes of activating the document 100, deactivating the document 100, validating an amount or activation status of the document, etc.

Figure 2:
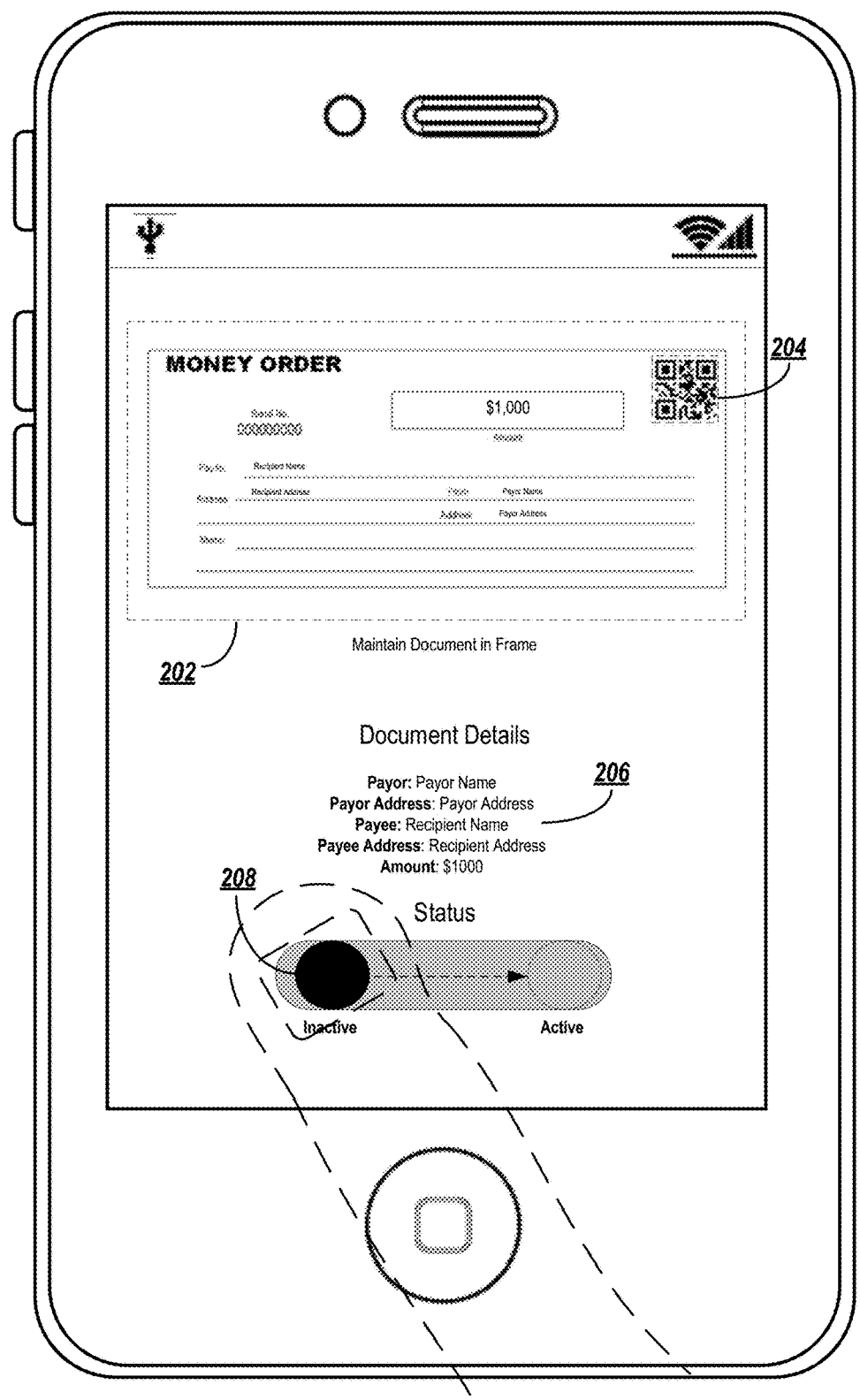
FIG. 2 depicts an interface suitable for activating a document in accordance with exemplary embodiments described herein.

Once logged into the account, the user may use the website, application, etc. to activate the document 100. An exemplary interface 200 suitable for activating the document 100 is depicted in FIG. 2.

In this example, the interface 200 is a graphical user interface presented through an application on the user's mobile device. The interface 200 may include a camera region 202 displaying an image received via a camera on the mobile device. The camera region 202 may include a focus region 204 into which the physical manifestation of the code 104 may be placed.

The interface 200 may include an information region 206 for presenting information pertaining to the document 100 (e.g., the amount, the originating user identity, the identity of the intended recipient, etc.). Information presented in the information region 206 may be read from the document 100 (e.g., by the device's camera) and/or may be retrieved from a remote database, such as a database maintained by the issuing institution and/or the entity associated with the user's account.

The interface 200 may further include an activation element 208, such as a button, slider bar, toggle, etc. The activation element 208 may include an activated configuration and a deactivated configuration. By default, the activation element 208 may be in the deactivated configuration. Once the user interacts with the activation element 208 (e.g., by sliding a button from left-to-right in FIG. 2), the document may be placed in the activated state (or vice versa, if the user places the activation element 208 in the deactivated configuration). In some embodiments, the user may change the configuration of the activation element 208 at will, so that the document 100 may be placed in the activated state, subsequently de-activated, and then re-activated as desired.

In some embodiments, the activation element 208 may not be displayed if the user is not authorized to activate the document 100. For example, if the originating user transfers the document 100 to a recipient, the originating user and/or recipient may indicate that the transfer has occurred through the application, website, etc. After the transfer has taken place, ownership of the document 100 has been transferred to the recipient, and the originating user may not be authorized to activate or deactivate the document. Thus, even if the originating user scans the code 104 in the interface 200, the interface 200 may not present the user with an activation element 208. Optionally, a message may be presented indicating the reason why the user is not authorized to activate or deactivate the document 100.

In some embodiments, the interface 200 may include a button or other element indicating that the document 100 is being transferred. In others, the recipient of the document 100 may scan the document's code 104 in their own version of the application, website, etc. (linked to the recipient's account), which may indicate that the document 100 has been transferred (in some embodiments, the recipient may need to scan the document and also indicate that the transfer has occurred, such as by confirming that this is the case in a pop-up window or by selecting an appropriate interface element).

The interface 200 may provide other ways to activate the document 100. For example, the interface 200 may provide access to a microphone, and the physical manifestation of the code 104 may play an audible tone or sequence of tones to validate the identity of the note. The physical manifestation of the code 104 may otherwise audibly or visually provide a signal that can be interpretable by the user's device. In some embodiments, if no camera, microphone, etc. is accessible on the user's device, the note may provide a human-discernible version of the code (e.g., an identifier number or passcode), or may indicate contact information (such as a phone number, email address, website, etc.) at which such human-discernible information may be found. A user may enter the human-discernible information into the interface 200 to identify the document 100 that they wish to activate.

By requiring activation through the interface 200, exemplary embodiments provide two layers of security. Because the user must be logged into their account to activate the document 100, the document cannot be used if it is lost, stolen, etc. (assuming that the party that obtains the document does not have access to the user's account login information). And because the interface 200 requires that code from the document 100 be entered or scanned, the document 100 cannot be activated if the user's account is compromised (assuming that the compromising party does not have access to the document 100).

Figure 3:
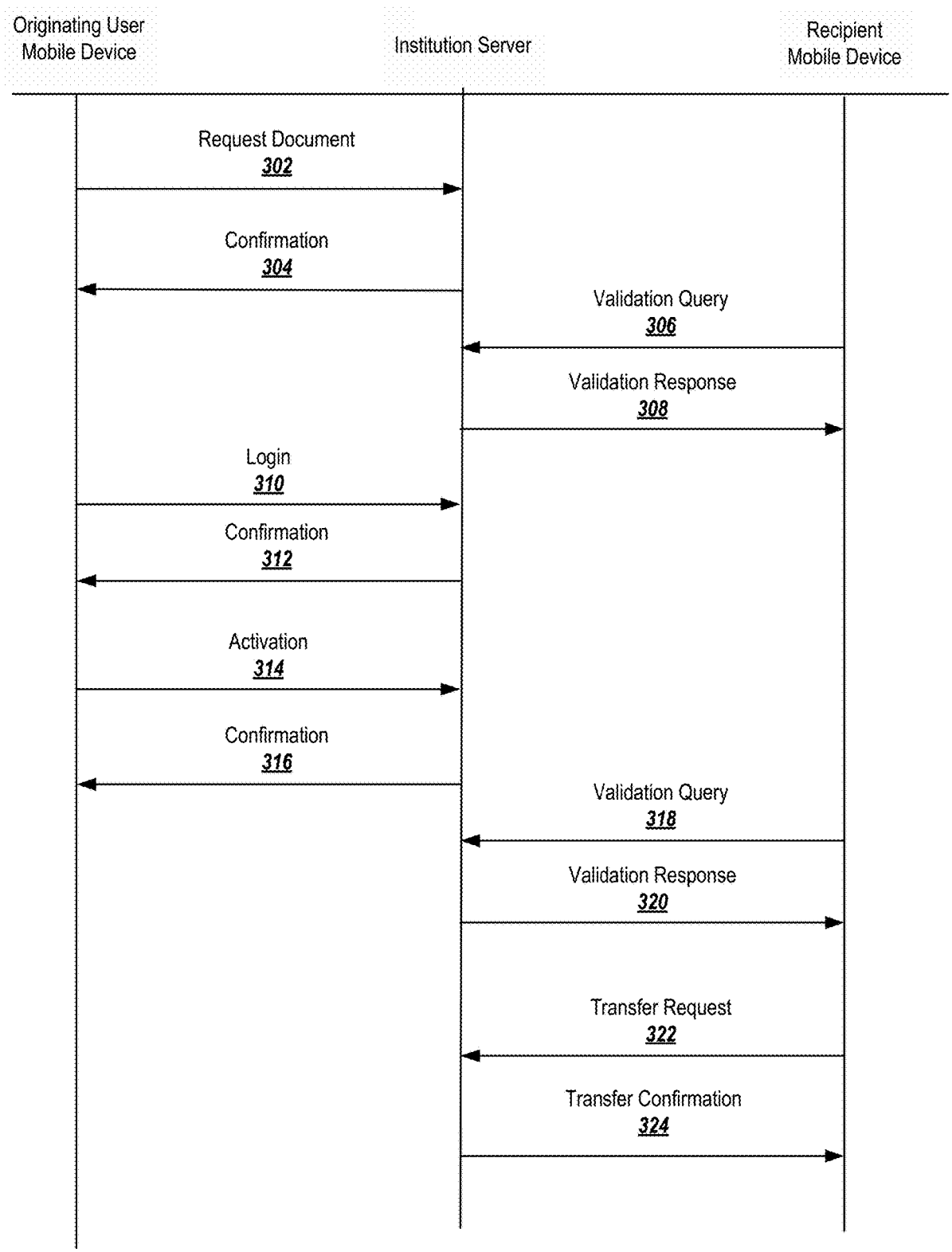
FIG. 3 is a data flow diagram depicting an exemplary authorization process

FIG. 3 is a data flow diagram depicting an exemplary authorization process.

Initially, the user may issue a request 302 for a secure document. The request may be submitted via the user's mobile device (e.g., by logging into an application for an issuing institution responsible for issuing the document); alternatively, the document request may be submitted some other way, such as by having the user present the request in-person at the institution, or by calling the institution. The request may specify a requested amount or value for the document, such as a specified currency value of a money order or a cashier's check. Optionally, the request 302 may specify an intended recipient of the document, such that the document may only be (initially) validly transferred from the originating user to the intended recipient.

In response to the request 302, the issuing institution may verify that the user has access to a source of value, such as funds in one or more associated accounts, at least equal to the requested value. In some cases, the institution may count certain assets as being available, although the assets may not yet have cleared one or more checks to ensure their accessibility. For example, if the user recently deposited a check to their account, the funds represented by the check may be credited to the account although the institution has not yet verified that the check has cleared. In order to protect against an unexpected low balance, the institution may choose not to count uncleared funds as being available. In some embodiments, the institution may calculate a confidence score for funds that are not yet guaranteed to be accessible, and may count funds as accessible if the confidence score exceeds a predetermined threshold. For example, if a user receives a pay check once a week, and the check has cleared every week for several years, the institution can be relatively confident that the check will eventually clear; the funds represented by such a check might be granted a relatively high confidence score. On the other hand, if a check has been issued from a person having a history of failing to have sufficient funds to cover the check, the funds represented by this check might be granted a relatively low confidence score.

Once the system verifies that the user has access to sufficient assets, the institution server may reply to the request 302 with a confirmation message 304, indicating that the document will be issued. In some embodiments, the system may wait to deliver the confirmation message 304 until the document has been prepared and is ready for pickup or delivery. In others, the system may issue the confirmation message 304 before the document is ready, and may optionally specify a time at which the document is expected to be ready for pickup or delivery. At the time the document is issued by the issuing institution, the document may be in a deactivated state. The institution server may log identifying information about the document (e.g., value, originating user information, intended recipient information, etc.), along with a current state of the document, in an institution database or log. The document may include a printed or embedded code.

After receiving the confirmation message, the originating user may pick up the document and may deliver the document to an intended recipient (alternatively, delivery may be handled by a third party, such as a courier service). The intended recipient may wish to validate that the document is genuine (e.g., that the issuing institution is willing to verify that the funds represented by the document will be transferred if the document is deposited).

Accordingly, the recipient may issue a validation query 306 via their mobile device. The validation query 306 may be generated, in part, by scanning the code on the document. The institution server may, in response to receiving the validation query, check the institution database to validate information about the document. Based on the information in the institution database, the institution server may formulate a validation response 308.

At this time, the document remains in the deactivated state, so the validation response 308 may indicate that the document is not active and cannot be used to transfer the funds associated with the document. The validation response 308 may optionally also identify information about the document (originating user, intended recipient, amount, etc.) for presentation on the recipient mobile device. Accordingly, the recipient can compare the information contained in the institution database to the information on the face of the document, in order to verify that the document has not been tampered with.

In order to activate the document, the originating user may log in to their account on an application, website, etc. via the originating user's mobile device. Logging in may cause a log in message 310 to be sent to the institution server and, assuming that the user is able to authenticate themselves, the institution server may respond with a confirmation message 312.

Once logged into their account, the user may request activation of the document by scanning the document and interacting with an activation element, as depicted in FIG. 2. This may cause an activation message 314 to be sent to the institution server. The institution server may, in response to receiving the activation message 314 and verifying that the activation message 314 came from an authenticated user associated with the document, change the state of the document in the institution database to "active." The institution server may respond to the activation message 314 with a confirmation 316 that the status has been updated.

The originating user may then hand the document over to the intended recipient, who may desire to validate that the document has been activated. Accordingly, the recipient mobile device again (in this example) issues a validation query 318 and receives a validation response 320. At this time, the document is in an active state, and so the validation response 320 indicates that the document is valid and active.

Subsequently, the recipient mobile device may send a message indicating that the document has been transferred (e.g., by interacting with an interactable "transfer" element, similar to the interactable "activate" element previously described). The recipient mobile device may scan the code on the document in order to effectuate the transfer request, or may interact with an interactable transfer element that pops up in response to a successful validation response 320. The recipient mobile device may transmit a transfer request 322 to the institution server, and (assuming that the institution server is able to validate the details of the transfer, such as the actual receiving user matching the intended recipient), may issue a transfer confirmation 324. The institution server may update the status of the document in the institution database, and may optionally automatically deactivate the document. Ownership of the document may be updated in the institution database so that the originating user is no longer capable of changing the activation status of the document (unless the document is subsequently validly transferred back to the originating user). The recipient may now activate or deactivate the document through their own account.

When transfer requests 322 are approved, the system may optionally log details to the transaction request in the database. This may allow, for instance, for a chain of custody of the document to be established. Upon submitting a request to the server, authorized users may retrieve the chain of custody from the database in order to see who transferred ownership of the document to whom and to verify that the document was transferred to the correct individual. In some embodiments, at the time of transfer the recipient of the document can specify a further intended recipient, such that the document can only be subsequently transferred to the further recipient (as outlined above). The number of subsequent transfers may be further limited by the receiving user and/or the issuing institution.

The above-described process is but one exemplary embodiment, with particular steps performed in a particular order. One of ordinary skill in the art will recognize that more, fewer, or different steps may be performed, and the steps may be performed in a different order, while remaining within the scope of the invention. FIGS. 4-6B depict various embodiments from different perspectives to further elucidate the invention. Unless otherwise noted, it is contemplated that the logic and procedures described in FIGS. 4-6B may be used in combination with each other and/or in combination with the above-described embodiments.

Figure 4:
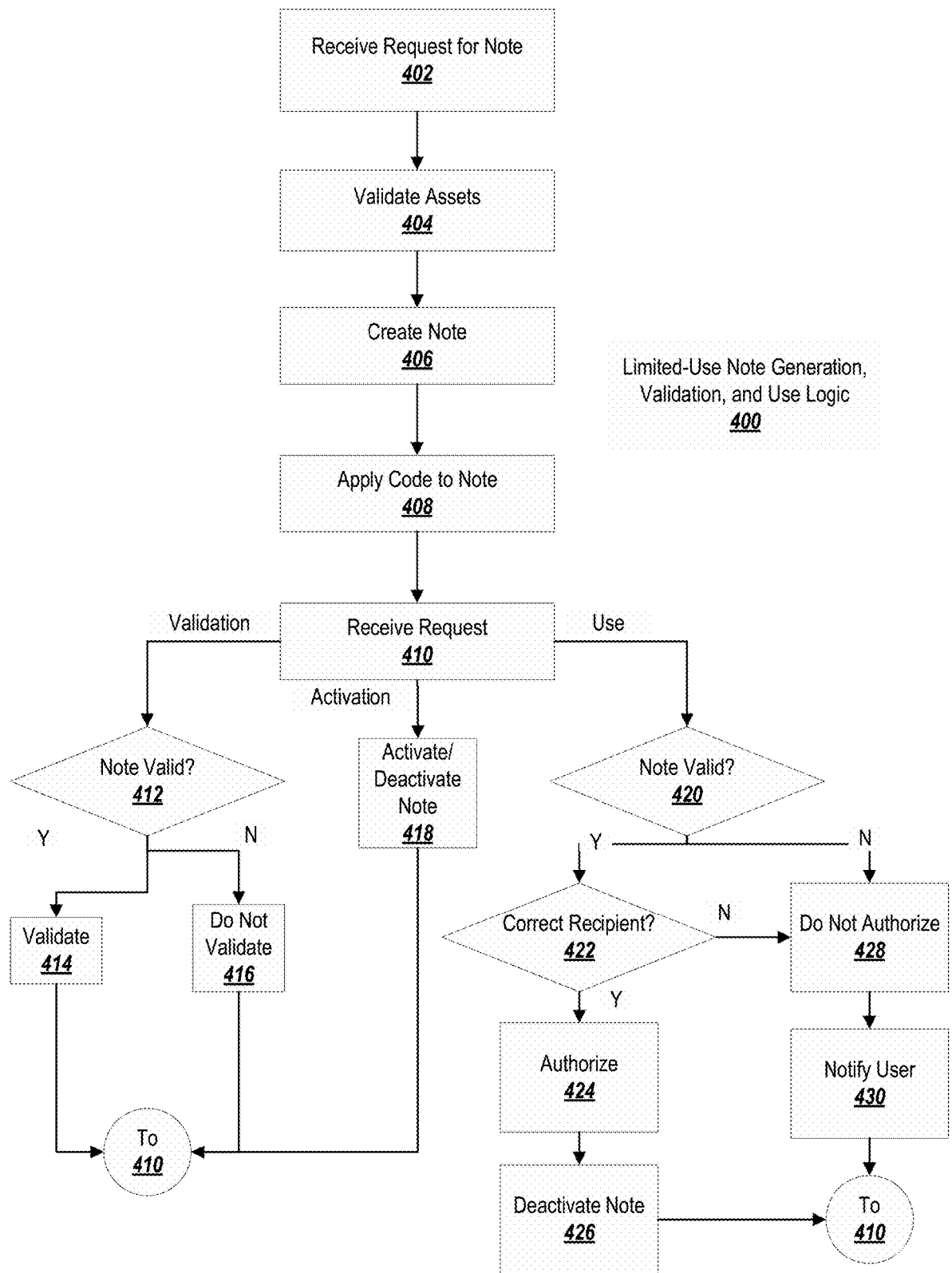
FIG. 4 is a flowchart depicting an exemplary process for activating a limited-use note.

FIG. 4 is a flowchart depicting logic 400 for performing an exemplary process for activating a limited-use note. The logic 400 may be performed, for example, by an institution server for an institution responsible for issuing and validating the limited-use note.

At block 402, the system may receive a request to issue a note. The request may specify an amount for the limited-use note. The request may be associated with a user account at an institution issuing the limited-use note; for example, the request may originate from a user device in which a user has logged into the account.

At block 404, the system may validate that the user account has access to assets valued at or greater than the amount of the amount specified in the request. In some embodiments, the system may exclude assets reflected in the user account whose availability has not been guaranteed. In some embodiments, the system may include an asset whose availability has not been guaranteed, but for which a calculated confidence score exceeds a predetermined threshold.

At block 406, the system may create the limited-use note, which may involve printing the limited-use note (including information specified in the original request) and/or updating an institution database or log to indicate that the note has been issued, the amount in which the note was issued, and any other information pertinent to the note.

The limited-use note may be capable of being in an activated or deactivated state. When the limited-use note is in the deactivated state, the limited-use note cannot be redeemed for the amount specified in the request. When the limited-use note is in the activated state, the limited-use note is redeemable for the amount specified in the request. At a time that the institution issues the note, the note may be in the deactivated state. This may involve creating the note in the deactivated state (e.g., by making the deactivated state the default state when a new note is created in the institution database), and/or by setting the note to the deactivated state.

At block 408, the system may apply a physical manifestation of a code on the limited-use note. The code may uniquely identify the limited-use note, and may be distinct from a serial number of the note. The physical manifestation may be, for example, a printed quick response (QR) code, a printed barcode, a radio frequency identifier (RFID) tag, a near field communications (NFC) device, or a Bluetooth device added to the note.

At block 410, the system may receive a request associated with the note, and may determine what type of request has been received. In one embodiment, the request may be a validation request, an activation request, or a use request.

If the request is a validation request, then at block 412 the system may determine whether the note is valid. A validation request may include a scanned or otherwise entered copy of the physical manifestation of the code and a request to validate the note associated with the code. Based on the information in the validation request (and, assuming that the user submitting the validation request is authorized to validate the note), the system may check the institution database to determine if the note is valid (e.g., has not been previously used) and if the note is in an active state.

The note may be considered valid if both of these conditions hold; if only one condition holds, the note cannot be used in its current form and is considered invalid. If the note is determined to be valid, then at block 414 the system may validate the note and send a message indicating that the note is valid. If not, then at block 416 the system may refuse to validate the note and may transmit a message indicating that the note is not valid. Processing may then proceed to block 410 and the system may await a further request with respect to the note.

If the request is an activation request, then processing may proceed from block 410 to block 418. An activation request may include a scanned or otherwise entered copy of the physical manifestation of the code and a request to activate or deactivate the note associated with the code. The system may check the institution database to determine a current status of the note (e.g., active or inactive) and may determine if the document can be set to the state indicated in the request. For example, if the document is already in the active state, and a request to activate the note is received, the system may respond that the state will not be changed because the note is already in the active state. On the other hand, if the note is in the inactive state, the system may proceed to activate the note, assuming that the user making the request in block 410 is authorized to do so. Processing may then proceed to block 410 and the system may await a further request with respect to the note.

A use request may be a request to transfer ownership of the note, or a request to transfer funds associated with the note. If the request is a use request, then at block 420 the system may determine if the note is valid; this analysis may proceed in the same manner as described above at block 412. If the note is valid (i.e., not previously used and currently active), then at block 422 the system may verify that the user attempting to use the note (e.g., the user associated with the request received at block 410) is the intended recipient specified at block 402 (assuming that a recipient was specified, and further assuming that the note has not already been transferred to the intended recipient, in which case the intended recipient may be authorized to freely transfer the note).

In some embodiments, the recipient attempting to use the note may be identified when the recipient logs into their own account to use the note. Alternatively, or in addition, the recipient may be identified based on extrinsic information. For example, the system may detect a presence of a mobile device associated with the requesting user in proximity to the limited-use note, such as by using an NFC, RFID, Bluetooth, etc. chip on the note to communicate with the recipient's mobile device and verify that the device matches a device associated with the intended recipient. In another example, the note interacts with a GPS device on the recipient's mobile device, and may check to verify that the note is present at a location associated with the intended recipient (e.g., the intended recipient's home or place of business).

If the recipient is correct, then at block 424, the system may authorize use of the note. This may involve updating the institution's database to reflect the new owner of the note, if the use request was a request to transfer the note. It may, alternatively or in addition, involve transferring funds into the recipient's account (and/or out of the originating user's account), if the use request was a request to consume the note. In either case, the note may optionally be deactivated automatically at block 426. If the request was to consume the note, then the deactivation may be permanent. If the request was to transfer the note, then the deactivation may be temporary, if the note is able to be transferred more than once (e.g., by endorsing the note to a new party). Processing may then proceed to block 410 and the system may await a further request with respect to the note.

If the note is not determined to be valid at block 420, or the recipient is not identified as proper at block 422, then at block 428 the system may refuse to authorize use of the note. Funds associated with the note may not be transferred, and at block 430 the originating user may be notified that an unauthorized attempt to use the note has been logged. In some embodiments, the system may permanently deactivate the note in response to a predetermined number (which may be one) of unauthorized usage requests. Processing may then proceed to block 410 and the system may await a further request with respect to the note.

In some embodiments, the system responsible for processing requests related to the note (at block 410) may be maintained by an entity distinct from the institution that issued the note. For example, the note may be issued by a bank, but a third party may process requests for validation, activation, and use. In some cases, requests 410 may be issued to the institution responsible for the note, but the databases pertaining to the activation status of the note may be maintained by another entity. In these cases, the device responsible for processing the requests 410 may expose an application programming interface (API) so that user devices and/or institution devices can interact with the request logic.

Figure 5:
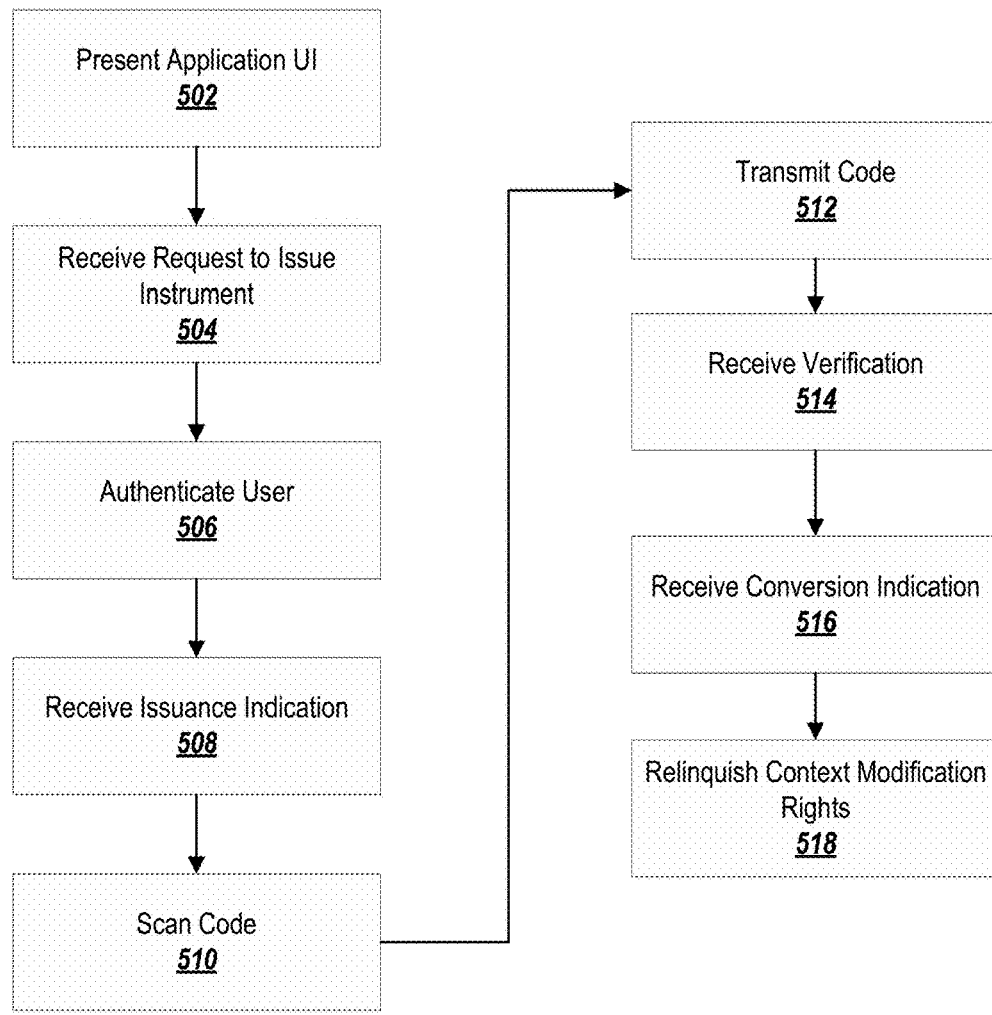
FIG. 5 is a flowchart depicting an exemplary process for verifying the convertibility of an instrument.

FIG. 5 is a flowchart depicting logic 500 for performing an exemplary process for verifying the convertibility of an instrument. The logic 500 may be embodied in a client device responsible for requesting an instrument, updating its context, and converting the instrument.

At block 502, the system may present a user interface on a user's mobile device. The user interface may be associated with an application providing access to a user account having an associated store of value, such as an account at an institution responsible for issuing instruments of specified values. The associated store of value may exclude assets reflected in the user account whose availability has not been guaranteed. The associated store of value may include an asset whose availability has not been guaranteed, but for which a calculated confidence score exceeds a predetermined threshold.

At block 504, the system may receive a request, via the user interface, to issue an instrument having a specified value. The instrument may be convertible to the specified value when the instrument is in a predefined context. One example of such a context is when the instrument is in an active state, as described above, although other contexts are also possible. For example, the instrument may be convertible only when in a predetermined location, at a predetermined time, or when held by a specified individual, or some combination of these contexts. The request may optionally specify the context in which the instrument is convertible.

At block 506, the system may authenticate the user account with a server, such as a server of the institution responsible for issuing the instrument.

At block 508, the system may receive an issuance indication indicating that the institution has, or will imminently, issue the instrument. In some embodiments, the instrument may be issued directly to the requesting user. In others, the instrument may be issued to a third party, such as a courier service assigned to deliver the instrument to a user associated with the user account. In this case, the indication may provide details relating to the third party, such as an identity of the courier or service and an estimated time of delivery.

At block 510, the system may scan a code on the instrument. In some cases, the instrument may not be in the predefined context (or may not be recognized as being in the predefined context) at the time the code is scanned.

At block 512, the code may be transmitted to the server. Receiving the code may cause the server to alter a context of the instrument (or to recognize and/or record that the instrument is in the predefined context).

At block 514, the system may verification from the server that the instrument is convertible and/or that the context has been updated.

At block 516, the system may receive an indication that the instrument has been converted by a recipient. In response to receiving the indication, at block 518 the system may relinquish an ability to modify the context of the instrument to the recipient. Alternatively, when the note is created, the originating user account may request an exclusive right to modify the context of the instrument (i.e., requests to modify, or further modify, the context from other parties may be disregarded. In another embodiment, it may be specified that the context can only be changed a predetermined number of times.

Figure 6A:
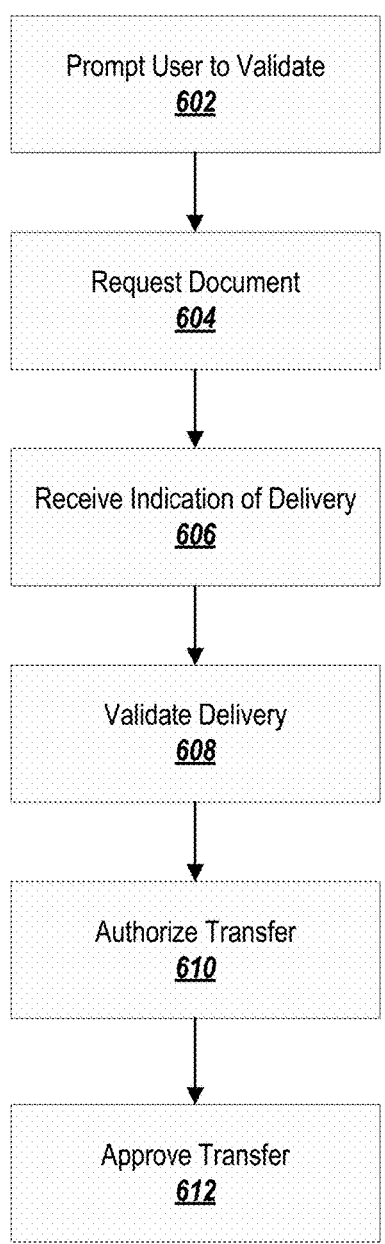
FIG. 6A is a flowchart depicting an exemplary process for approving a transfer of resources based on a document.
Figure 6B:
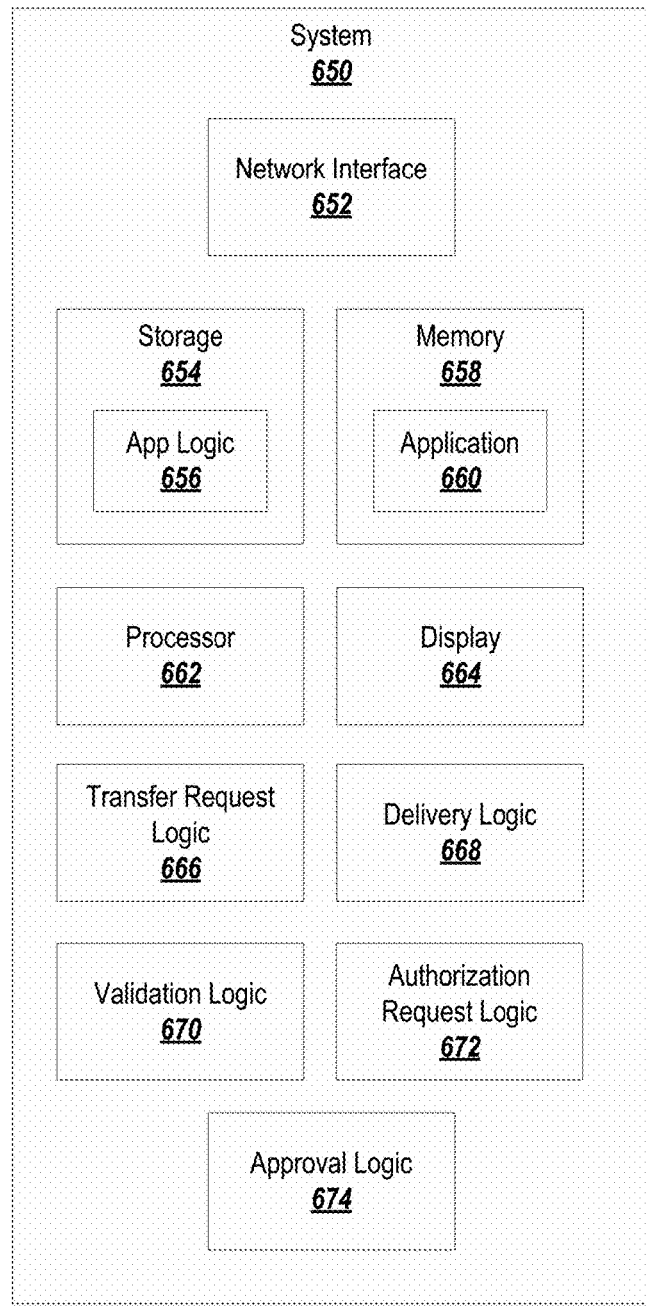
FIG. 6B is a block diagram depicting an exemplary system suitable for use with the process of FIG. 6A.

FIG. 6A is a flowchart depicting an exemplary process for approving a transfer of resources based on a document. FIG. 6B is a block diagram depicting an exemplary system 650 suitable for use with the process of FIG. 6A.

The system 650 may include a network interface 652, a non-transitory storage device 654 storing app logic 656 for providing an application associated with a user's profile stored on a remote server, and a memory 658 holding an executing version of the application 660. The system 650 may further include a hardware processor circuit 662 for executing logic.

The system 650 may include a display 664. The display 664 may be configured to, at block 602 of the process 600 depicted in FIG. 6A, prompt a user to validate themselves with a remote server.

Based at least partly on the validating, at block 604 the system 650 may be configured to request a document providing for a transfer of resources from the user to a third party, and to receive an indication that the document has been issued. Block 604 may be performed by transfer request logic 666 on the system 650.

The network interface 652 may be configured to receive, at block 606, an indication that the document has been delivered to the third party. Block 606 may be performed by delivery logic 668 on the system 650.

At block 608, the system 650 may confirm that the document has been delivered to the third party. Block 608 may be performed by validation logic 670. For example, the validation logic 670 may receive biometric identifying data (e.g., a fingerprint, iris scan, facial recognition, etc.) and may compare (or may request that a biometric server compare) the received identifying data to stored data relating to the third party. In another embodiment, the validation logic 670 may receive a location of the document (such as a location received from the third party's GPS device, coupled with a confirmation from the document that the document is co-located with the GPS device) and may confirm that the document is in a predefined intended location, such as a residence or place of work of the intended recipient.

At block 610, the system 650 may receive authorization to execute the transfer of resources represented by the document. Block 610 may be performed by authorization request logic 672. For example, the authorization request logic 672 may be configured to receive, from a remote server (e.g., a server belonging to an institution that issued the document), a code associated with the document. Alternatively or in addition, the authorization request logic 672 may indicate that a code will be forthcoming via separate channel, such as in an email, a text message, a phone call, a received video or photo, etc. . . . . The authorization request logic 672 may be configured to cause the application to prompt the user for the code associated with the document, and, when the code is correctly entered, to approve the transfer. Alternatively or in addition, the authorization request logic 672 may cause the display to present a toggable element via the application, wherein toggling the element causes the document to be turned on or capable of authorizing the transfer.

In block 612, the system may approve the transfer in response to receiving authorization in block 610. For example, approval logic 674 may transmit an approval instruction to the server.

Figure 7:
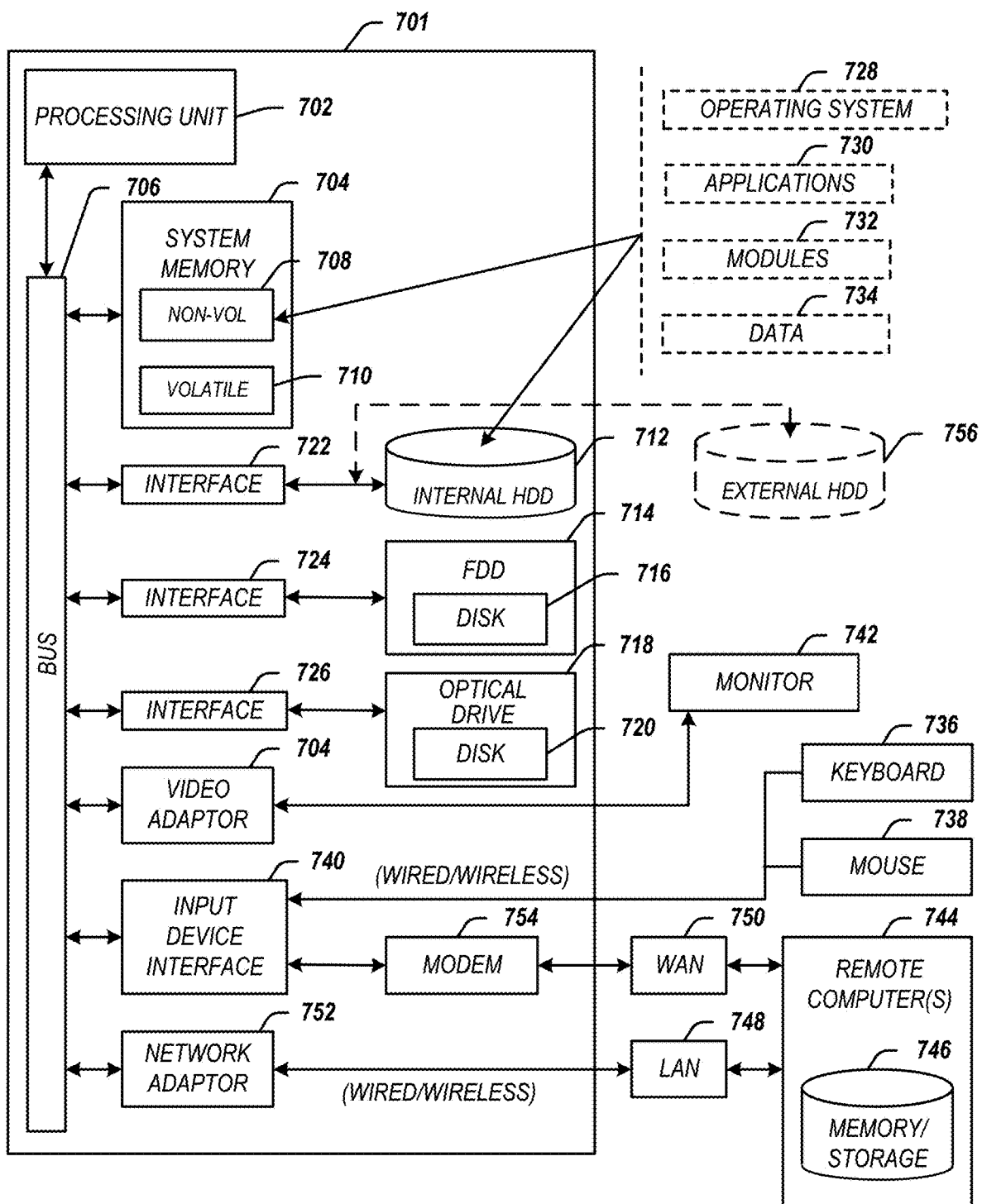
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, 756, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
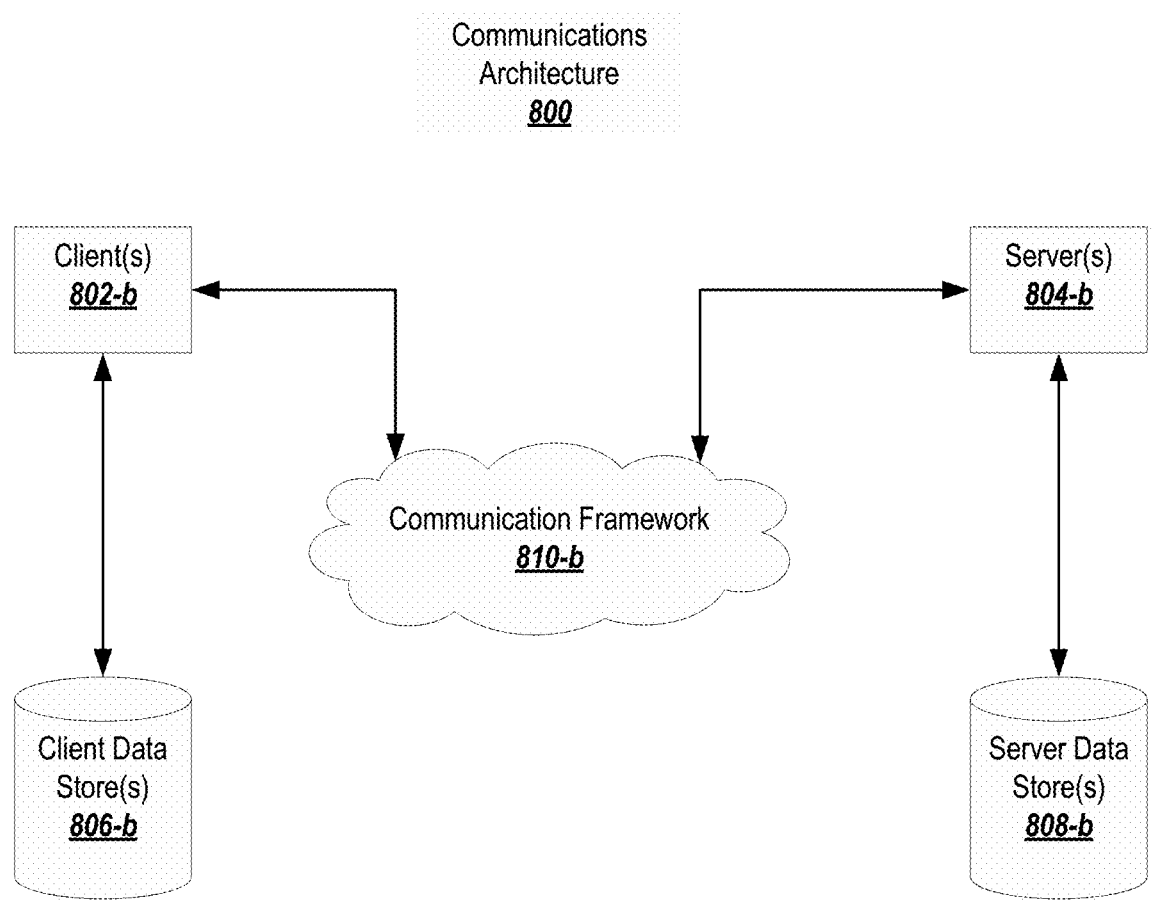
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device described above. The servers 804 may implement the server device descried above. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory computer-readable medium storing instructions that, when executed, cause one or more processors to:
   receive, by an institution device, a request for a limited-use note, the request specifying an amount for the limited-use note and being associated with a user account at an institution issuing the limited-use note;
   validate, by the institution device, that the user account has access to assets valued at or greater than the amount specified in the request;
   create the limited-use note, the creating comprising:
      applying a physical manifestation of a code on the limited-use note, the code uniquely identifying the limited-use note, and
      placing the limited-use note in a deactivated state at a time of issuance, wherein the limited-use note is capable of being in an activated or deactivated state, wherein when the limited-use note is in the deactivated state, the limited-use note cannot be redeemed for the amount specified in the request, and wherein when the limited-use note is in the activated state, the limited-use note is redeemable for the amount specified in the request;
   receive, by the institution device, a request to activate the limited-use note, the request associated with an activation of the physical manifestation of the code and received from a client device of a user associated with the user account, the request to activate transmitted as a result of receiving an interaction with a user of an interactable element on an interface of the client device, the interactable element configured to be set into a first configuration associated with the deactivated state of the note and a second configuration associated with the activated state of the note, the interaction comprising receiving a haptic touch signal at a first location in the interface associated with the deactivated state, maintaining haptic contact while the haptic touch signal is moved from the first location to a second location in the interface associated with the activated state, and receiving a haptic release signal at the second location;
   validate the request to activate, the validating comprising:
      authenticating that the user is logged into the user account on the client device, and
      verifying that the user was logged in at the time the physical manifestation of the code was requested to be activated; and
   in response to validating the request to activate the limited-use note, place the limited-use note in the activated state.

2. The non-transitory computer-readable medium of claim 1, wherein the physical manifestation of the code comprises at least one of: a printed quick response (QR) code, a printed barcode, a radio frequency identifier (RFID) tag, a near field communications (NFC) device, or a wireless device.

3. The non-transitory computer-readable medium of claim 1, further storing instructions that, when executed, cause the one or more processors to:
   receive a validation request from a validating user;
   determine that the limited-use note is valid, the determining comprising:
      determining that the limited-use note is in the activated state, and
      determining that the limited use note has not been previously used; and
   in response to the determining, respond to the validation request by indicating that the limited-use note is valid.

4. The non-transitory computer-readable medium of claim 3, wherein the institution device supports an application programming interface (API) call associated with the validation request, and wherein the validation request is received as part of the API call.

5. The non-transitory computer-readable medium of claim 1, further storing instructions that, when executed, cause the one or more processors to:
   receive a request to use the limited-use note;
   verify that the limited-use note is in the activated state and has not been previously used; and
   in response to the verifying, authorize a use of the limited-use note.

6. The non-transitory computer-readable medium of claim 1, wherein the request to activate further specifies an intended recipient for the limited-use note, and further storing instructions that, when executed, cause the one or more processors to:
   receive a request to use the limited-use note, the request to use specifying a requesting user;
   verify that the requesting user is the intended recipient;
   in response to the verifying, authorize a use of the limited-use note; and
   after the use of the limited-use note, place the limited-use note in the deactivated state.

7. The non-transitory computer-readable medium of claim 6, wherein the requesting user is specified by detecting a presence of a mobile device associated with the requesting user in proximity to the limited-use note, or receiving the request to use the limited-use note from an application associated with the requesting user.

8. A method comprising:
receiving, by an institution device, a request for a limited-use note, the request specifying an amount for the limited-use note and being associated with a user account at an institution issuing the limited-use note;
validating, by the institution device, that the user account has access to assets valued at or greater than the amount specified in the request;
creating the limited-use note, the creating comprising:
applying a physical manifestation of a code on the limited-use note, the code uniquely identifying the limited-use note, and
placing the limited-use note in a deactivated state at a time of issuance, wherein the limited-use note is capable of being in an activated or deactivated state, wherein when the limited-use note is in the deactivated state, the limited-use note cannot be redeemed for the amount specified in the request, and wherein when the limited-use note is in the activated state, the limited-use note is redeemable for the amount specified in the request;
receiving, by the institution device, a request to activate the limited-use note, the request associated with an activation of the physical manifestation of the code and received from a client device of a user associated with the user account, the request to activate transmitted as a result of receiving an interaction with a user of an interactable element on an interface of the client device, the interactable element configured to be set into a first configuration associated with the deactivated state of the note and a second configuration associated with the activated state of the note, the interaction comprising receiving a haptic touch signal at a first location in the interface associated with the deactivated state, maintaining haptic contact while the haptic touch signal is moved from the first location to a second location in the interface associated with the activated state, and receiving a haptic release signal at the second location;
validating the request to activate, the validating comprising:
authenticating that the user is logged into the user account on the client device, and
verifying that the user was logged in at the time the physical manifestation of the code was requested to be activated; and
in response to validating the request to activate the limited-use note, placing the limited-use note in the activated state.

9. The method of claim 8, wherein the physical manifestation of the code comprises at least one of: a printed quick response (QR) code, a printed barcode, a radio frequency identifier (RFID) tag, a near field communications (NFC) device, or a wireless device.

10. The method of claim 8, further comprising:
receiving a validation request from a validating user;
determining that the limited-use note is valid, the determining comprising:
determining that the limited-use note is in the activated state, and
determining that the limited use note has not been previously used; and
in response to the determining, responding to the validation request by indicating that the limited-use note is valid.

11. The method of claim 10, wherein the institution device supports an application programming interface (API) call associated with the validation request, and wherein the validation request is received as part of the API call.

12. The method of claim 8, further comprising:
receiving a request to use the limited-use note;
verifying that the limited-use note is in the activated state and has not been previously used; and
in response to the verifying, authorizing a use of the limited-use note.

13. The method of claim 8, further comprising:
receiving a request to use the limited-use note, the request to use specifying a requesting user;
verifying that the requesting user is the intended recipient;
in response to the verifying, authorizing a use of the limited-use note; and
after the use of the limited-use note, placing the limited-use note in the deactivated state.

14. The method of claim 13, wherein the requesting user is specified by detecting a presence of a mobile device associated with the requesting user in proximity to the limited-use note, or receiving the request to use the limited-use note from an application associated with the requesting user.

15. A system comprising:
An institution device comprising:
one or more processors; and
a data storage storing instructions which, when executed by the one or more processors, cause the one or more processors to perform steps comprising:
receiving a request for a limited-use note, the request specifying an amount for the limited-use note and being associated with a user account at an institution issuing the limited-use note;
validating that the user account has access to assets valued at or greater than the amount specified in the request;
creating the limited-use note, the creating comprising:
applying a physical manifestation of a code on the limited-use note, the code uniquely identifying the limited-use note, and
placing the limited-use note in a deactivated state at a time of issuance, wherein the limited-use note is capable of being in an activated or deactivated state, wherein when the limited-use note is in the deactivated state, the limited-use note cannot be redeemed for the amount specified in the request, and wherein when the limited-use note is in the activated state, the limited-use note is redeemable for the amount specified in the request;
receiving a request to activate the limited-use note, the request associated with an activation of the physical manifestation of the code and received from a client device of a user associated with the user account, the request to activate transmitted as a result of receiving an interaction with a user of an interactable element on an interface of the client device, the interactable element configured to be set into a first configuration associated with the deactivated state of the note and a second configuration associated with the activated state of the note, the interaction comprising receiving a haptic touch signal at a first location in the interface associated with the deactivated state, maintaining haptic contact while the haptic touch signal is moved from the first location to a second location in the interface associated with the activated state, and receiving a haptic release signal at the second location;
  validating the request to activate, the validating comprising:
    authenticating that the user is logged into the user account on the client device, and
    verifying that the user was logged in at the time the physical manifestation of the code was requested to be activated; and
  in response to validating the request to activate the limited-use note, placing the limited-use note in the activated state.

16. The system of claim 15, wherein the physical manifestation of the code comprises at least one of: a printed quick response (QR) code, a printed barcode, a radio frequency identifier (RFID) tag, a near field communications (NFC) device, or a wireless device.

17. The system of claim 15, wherein instructions which, when executed by the one or more processors, cause the one or more processors to perform further steps comprising:
  receiving a validation request from a validating user;
  determining that the limited-use note is valid, the determining comprising:
    determining that the limited-use note is in the activated state, and
    determining that the limited use note has not been previously used; and
  in response to the determining, responding to the validation request by indicating that the limited-use note is valid.

18. The system of claim 15, wherein instructions which, when executed by the one or more processors, cause the one or more processors to perform further steps comprising:
  receiving a request to use the limited-use note;
  verifying that the limited-use note is in the activated state and has not been previously used; and
  in response to the verifying, authorizing a use of the limited-use note.

19. The system of claim 15, wherein instructions which, when executed by the one or more processors, cause the one or more processors to perform further steps comprising:
  receiving a request to use the limited-use note, the request to use specifying a requesting user;
  verifying that the requesting user is the intended recipient;
  in response to the verifying, authorizing a use of the limited-use note; and
  after the use of the limited-use note, placing the limited-use note in the deactivated state.

20. The system of claim 15, wherein the requesting user is specified by detecting a presence of a mobile device associated with the requesting user in proximity to the limited-use note, or receiving the request to use the limited-use note from an application associated with the requesting user.

* * * * *